United States Patent [19]

Zanoni

[11] 4,128,316
[45] Dec. 5, 1978

[54] THIN ELECTROCHROMIC DISPLAY

[75] Inventor: Louis A. Zanoni, Trenton, N.J.

[73] Assignee: Timex Corporation, Waterbury, Conn.

[21] Appl. No.: 806,893

[22] Filed: Jun. 15, 1977

[51] Int. Cl.² ............... G02F 1/00; G02F 1/17; G02F 1/23
[52] U.S. Cl. ............... 350/357
[58] Field of Search ............... 350/357, 334, 343; 29/570, 592 R

[56] References Cited

U.S. PATENT DOCUMENTS

| | | | |
|---|---|---|---|
| 3,944,333 | 3/1976 | Leibowitz | 350/357 |
| 3,957,086 | 8/1976 | Leibowitz | 350/357 |
| 3,995,943 | 12/1976 | Jasinski | 350/357 |
| 4,012,831 | 3/1977 | Leibowitz | 29/570 |
| 4,056,881 | 11/1977 | Holt et al. | 29/592 R |
| 4,066,336 | 1/1978 | Zeller | 350/357 |
| 4,067,644 | 1/1978 | Diouhy et al. | 350/357 |

*Primary Examiner*—Stanley D. Miller, Jr.
*Assistant Examiner*—James W. Davie
*Attorney, Agent, or Firm*—William C. Crutcher

[57] ABSTRACT

A thin electrochromic display employs a transparent substrate with transparent electrodes and electrochromic material thereon forming actuatable electrochromic segments, a fibrous spacer member adjacent the substrate and impregnated in its central portion with electrolyte in contact with the electrochromic material, and impregnated in its peripheral portions surrounding the central portion with a sealing adherent resin, and a conductive foil member covering the central portion of the carrier and sealed about its periphery by means of the curable resin to the substrate.

6 Claims, 2 Drawing Figures

4,128,316

THIN ELECTROCHROMIC DISPLAY

BACKGROUND OF THE INVENTION

Briefly stated, this invention relates to electrooptic displays of the electrochromic type, and more particularly to an improved construction for a thin electrochromic display.

Electrochromic displays are known which employ electrochromic material on spaced parallel substrates with porous separating material between the substrates carrying the electrolyte and pigment material providing contrast for the segments. Such a display is shown in U.S. Pat. No. 3,944,333 issued Mar. 16, 1976 in the name of Marshall Liebowitz and assigned to the present assignee, which is incorporated herein by reference. Such displays having two substrates or supporting plates prove to be thick and bulky. Other examples of electrochromic displays with two substrates and porous or fibrous separators are shown in U.S. Pat. No. 3,892,472 issued to Giglia on July 1, 1975 and U.S. Pat. No. 3,840,288 issued to Schnatterly on Oct. 8, 1974. Such constructions have generally employed some sort of external seal between substrates, such as epoxy resin or the like.

An alternate approach is to contain electrolytes of liquid or gel between the substrates. Since these materials are fluid and not self-supporting they require peripheral spacers between substrates to contain the electrolyte and seal the display as well as providing spacing between the substrates. Such constructions are shown for example in U.S. Pat. No. 3,879,108 issued Apr. 22, 1975 to Baritz, or U.S. Pat. No. 3,704,057 issued Nov. 28, 1972 to Beegle, these being merely exemplary of many.

Electrochromic displays have been described utilizing only one transparent substrate, with the active elements applied as layers to the substrate. Examples of these are U.S. Pat. No. 3,971,624, issued July 27, 1976 to Bruesch et al, and U.S. Pat. No. 3,995,943 issued Dec. 7, 1976 to Jasinski, these patents showing metal layers applied over solid electrolyte layers. The electrolyte layers perform the spacing function. The foregoing patents require special means for sealing the back electrode metal layers and making electrical contact thereto.

It would be desirable to have a thin electrochromic display construction, utilizing only a single substrate, with a simple means for applying and sealing the back electrode to contain the electrolyte, maintaining suitable spacing, providing proper contact of the electrolyte with the electrochromic material on the segments, carrying the contrasting pigment, and facilitating cationic transport to and from the electrochromic material.

Accordingly, one object of the present invention is to provide an improved construction for a thin electrochromic display.

Another object of the invention is to provide an improved construction for sealing an electrochromic display and containing the electrolyte.

DRAWINGS

The invention, both as to organization and method of practice, together with further objects and advantages thereof, will best be understood by reference to the following description, taken in connection with the accompanying drawings, in which:

FIG. 1 is a plan view of the back side of an improved electrochromic display according to the present invention, and FIG. 2 is an elevation drawing in cross section, taken along lines II—II of FIG. 1.

SUMMARY OF THE INVENTION

Briefly stated, the invention is practiced by providing a transparent substrate having transparent electrodes with electrochromic material thereon, a fibrous spacer member having electrolyte impregnated in the central portion thereof in contact with the electrochromic material and having a sealing adherent resin impregnated in the peripheral portions thereof surrounding the central portion, and a conductive metal foil having its active surface disposed in contact with the central portion of the fibrous spacer and having its outer periphery sealed to the substrate by means of the adherent resin.

DESCRIPTION OF THE PREFERRED EMBODIMENT

Figure 1:
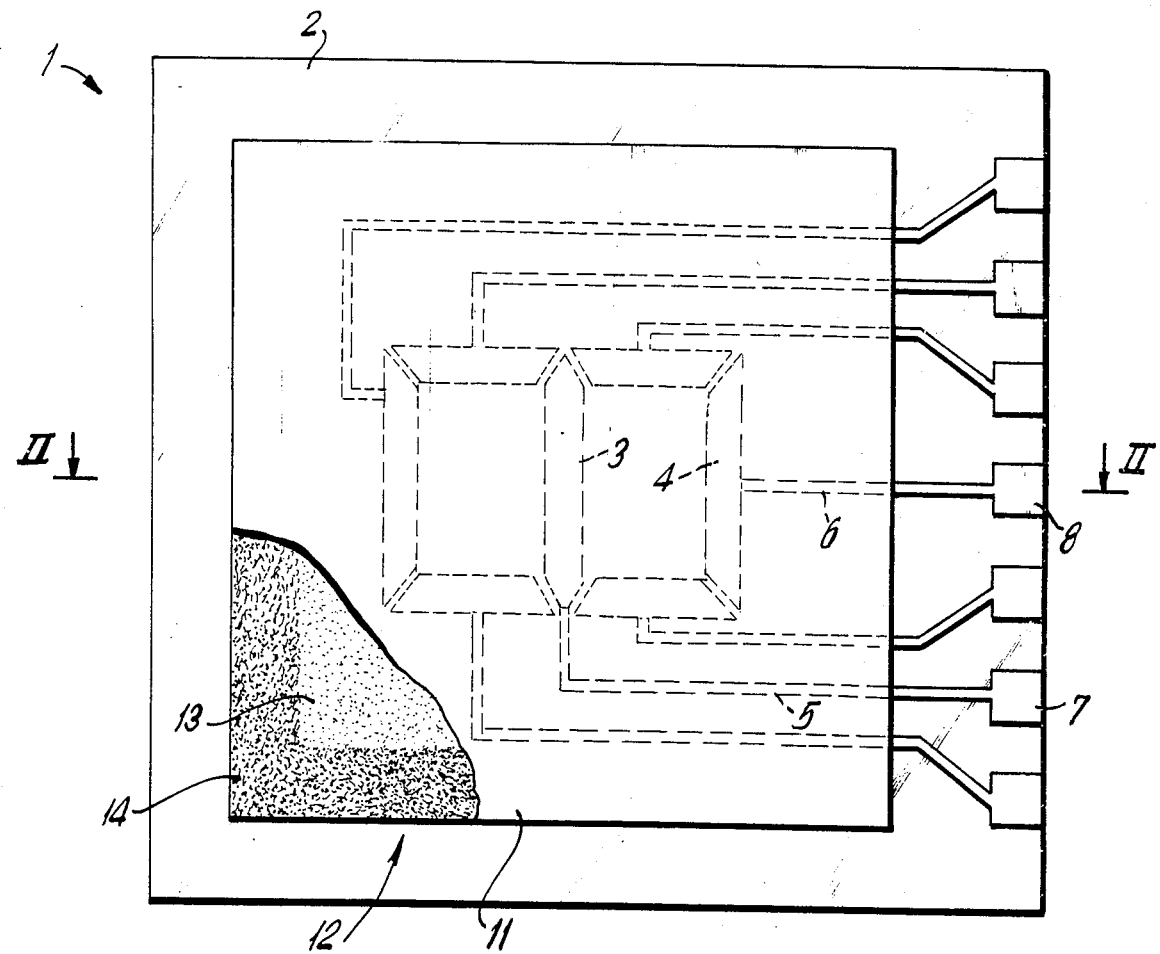
Figure 2:
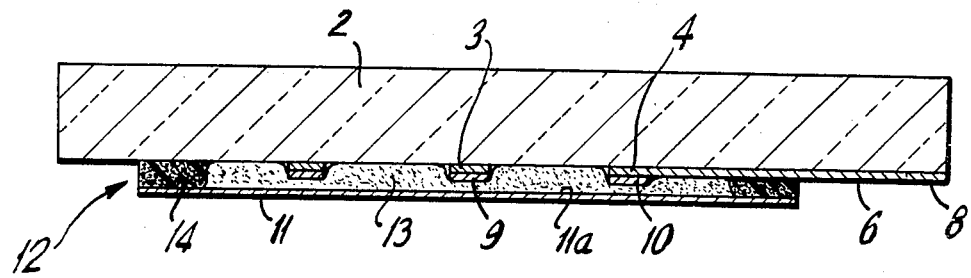

Referring now to FIG. 1 of the drawing, a simplified version of a single digit electronic display is shown at 1, looking at the rear side, to comprise a substrate 2 of transparent material such as glass or plastic having transparent electrodes such as 3,4 thereon connected by leads 5,6 to electrical contact terminals 7,8 respectively. The transparent electrodes 3,4 have layers of electrochromic material 9,10 thereon, preferably tungsten oxide. There are many suitable electrochromic materials which change their colors according to the particular oxide state. These are well known in the art, and by way of example, a large number of conventional materials are referred to in the disclosure of U.S. Pat. No. 3,521,941 to Deb et al. Tungsten oxide is preferably deposited on the glass substrate electrodes by vacuum evaporation, however, many other processes can be utilized. The electrodes 3,4 are preferably formed by etching away the conductive transparent surface on commerically available NESA glass to leave the desired electrode shapes. The segments will darken or bleach according to the oxide state of the electrochromic material.

The back electrode preferred in the present invention is a thin conductive metallic foil shown at 11, having a central active surface 11a which facilitates cationic transport from the back electrode to and from the electrochromic material 9,10 on electrodes 3,4. The foil is preferably cut from a sheet of tungsten foil on the order of 0.001 inches thick and prepared with an electroreactive layer utilizing the process of the assignee's U.S. Pat. No. 4,012,831 issued Mar. 22, 1977 to Marshall Leibowitz, this patent being incorporated herein by reference. Briefly the electroreactive surface is applied by surface oxidizing the foil and subsequently reducing it in a hydrogen atmosphere at an elevated temperature. This electroreactive layer serves as the source of cations and it is also electrically conductive so that it can serve as the rear electrode.

In accordance with the present invention, a preformed fibrous spacer member shown generally at 12 is prepared in the following manner. A fibrous filter material, such as fiberglass, is partially impregnated with a simple pigment such as titanium dioxide which will provide a contrast for the display segments when they are darkened. Such methods for pigmenting a fibrous material are known in the art.

The central portion 13 of the fibrous spacer is impregnated with an electrolyte, many of which are well known and disclosed in the prior art, such as the aforementioned U.S. Pat. No. 3,944,333. Liquids, gels or semisolids can be used. Powdered solids such as cationic ion exchange resins can be packed into the interstices of the fibrous spacer. I prefer a semi-solid cationic ion exchange resin, such as sulfonated polystyrene in the hydrogen form.

The outer periphery 14 of the spacer 12 is impregnated with a sealing adherent resin. This may be an epoxy type resin selected to be compatible with the electrolyte and polymerizable by means of heat, pressure, or catalyst. However the preferred material for this purpose is one of the commercially available hot melt adhesives, which when heated are liquid, and when cooled to room temperature become both sealant and adhesive. Such materials are used in the well-known "glue guns."

The aforementioned impregnating steps may be done by screen printing methods using suitable masks so that the impregnating materials may be selectively applied in the central portion and outer periphery. If a curable resin is used, the spacer member is prepared without curing the resin, since this curing will be done in place.

To assemble the display, it is only necessary to place the prepared spacer member 12 over the electrodes, place the special foil 11 over the spacer member, and apply means, such as heat, to the peripheral portion of the foil to cure the resin and cause it to adhere and seal the display. Mechanical alignment is not critical, since the entire back electrode surface reacts with the electrochromic material. The method presses the spacer against the electrodes and thus affords good electrical contact between the electrolyte and the electrodes.

In operation, the foil itself serves as one of the electrical contact terminals. A current source applied between the foil and one of the contact terminals such as 7 or 8 causes darkening or bleaching of the selected segment. The electroreactive layer 11a of tungsten bronze on the foil facilitates cationic transport through the electrolyte to and from the electrochromic material.

The foregoing construction affords an extremely thin electrochromic display which is effective and simple to assemble.

While there has been shown what is considered to be the preferred embodiment of the invention, it is of course understood that various other modifications may be made therein, and it is intended to cover in the appended claims all such modifications as fall within the true spirit and scope of the invention.

What is claimed is:

1. An electrochromic display device having a single substrate member, said device comprising:
    a transparent substrate having transparent electrodes with electrochromic material thereon,
    a fibrous spacer member impregnated in its central portion with an electrolyte disposed in contact with the electrochromic material on said electrodes, and impregnated in its peripheral portions surrounding the central portion with an adherent sealing resin, and
    a sheet of conductive metal foil having a central portion with an active surface disposed in contact with said electrolyte to facilitate cationic transport, and having its peripheral portion surrounding the central portion sealed and bonded to said substrate by means of said adherent resin.

2. The combination according to claim 1, wherein said electrolyte comprises a semi-solid cationic ion exchange resin, and wherein said fibrous spacer member is fiberglass.

3. The combination according to claim 1, wherein said foil comprises tungsten and wherein said active surface comprises an electroreactive surface applied by surface oxidizing the foil and subsequently by reducing it in hydrogen atmosphere, all at an elevated temperature.

4. The combination according to claim 1, wherein said adherent sealing resin comprises a hot melt adhesive.

5. The combination according to claim 1, wherein said adherent sealing resin comprises a curable epoxy resin.

6. The combination according to claim 1, wherein said fibrous spacer material comprises fiberglass filter material partially impregnated with color-contrasting pigment.

* * * * *